United States Patent
Gil Lizarbe et al.

(10) Patent No.: US 10,749,343 B2
(45) Date of Patent: Aug. 18, 2020

(54) CONTROL METHOD FOR A SYSTEM COMPRISING A FREQUENCY CONVERTER CONNECTED TO A POWER GRID

(71) Applicant: INGETEAM POWER TECHNOLOGY, S.A., Zamudio (ES)

(72) Inventors: Beatriz Gil Lizarbe, Sarriguren (ES); Carlos Girones Remirez, Sarriguren (ES); Eduardo Sanz Ceballos, Zamudio (ES)

(73) Assignee: INGETEAM POWER TECHNOLOGY, S.A., Zamudio (ES)

( * ) Notice: Subject to any disclaimer, the term of this patent is extended or adjusted under 35 U.S.C. 154(b) by 595 days.

(21) Appl. No.: 15/527,257

(22) PCT Filed: Feb. 2, 2015

(86) PCT No.: PCT/ES2015/070070
§ 371 (c)(1),
(2) Date: May 16, 2017

(87) PCT Pub. No.: WO2016/124797
PCT Pub. Date: Aug. 11, 2016

(65) Prior Publication Data
US 2017/0353036 A1    Dec. 7, 2017

(51) Int. Cl.
*H02J 3/24* (2006.01)
*H02J 3/38* (2006.01)
(Continued)

(52) U.S. Cl.
CPC ............ *H02J 3/24* (2013.01); *H02J 3/381* (2013.01); *H02J 3/386* (2013.01); *H02J 3/1807* (2013.01);
(Continued)

(58) Field of Classification Search
CPC .......... H02J 3/386; H02J 3/24; H02J 3/18–22; Y02E 10/76–763
See application file for complete search history.

(56) References Cited

U.S. PATENT DOCUMENTS

| 5,227,713 A | 7/1993 | Bowler et al. |
| 2011/0101689 A1* | 5/2011 | Larsen ................. H02P 9/007 290/44 |

(Continued)

FOREIGN PATENT DOCUMENTS

| EP | 2 317 134 A2 | 5/2011 |
| WO | 2011/112571 A2 | 9/2011 |

(Continued)

OTHER PUBLICATIONS

M. Bongiorno, L. Angquist, J. Svensson, "A novel control strategy for subsynchronous resonance mitigation using SSSC", Mar. 31, 2008, IEEE, IEEE Transactions on Power Deliver, vol. 23, Issue 2. (Year: 2008).*

(Continued)

*Primary Examiner* — Rexford N Barnie
*Assistant Examiner* — David A Shiao
(74) *Attorney, Agent, or Firm* — Sughrue Mion, PLLC

(57) ABSTRACT

A method which is suitable for a system having a frequency converter and a generator, both of which are connected to a power grid, includes obtaining sub-synchronous components of the grid voltage and determining damping current set points according to the sub-synchronous components to compensate for sub-synchronous resonances of the grid. Damping current set points are determined by receiving the sub-synchronous components of the grid voltage and returning damping current set points as outputs. A variable damping gain is adjusted according to the sub-synchronous frequency of the grid, such that the required compensation level (Continued)

can be adapted to the frequency converter for damping sub-synchronous resonance of the grid.

16 Claims, 7 Drawing Sheets

(51) Int. Cl.
$H02J\ 3/18$ (2006.01)
$H02P\ 9/00$ (2006.01)

(52) U.S. Cl.
CPC .......... *H02J 2300/28* (2020.01); *H02P 9/007* (2013.01); *Y02E 10/763* (2013.01); *Y02E 40/30* (2013.01)

(56) References Cited

U.S. PATENT DOCUMENTS

| | | | |
|---|---|---|---|
| 2012/0038156 A1* | 2/2012 | Hehenberger | F03D 7/0284 290/44 |
| 2012/0205981 A1* | 8/2012 | Varma | H02J 3/01 307/64 |
| 2012/0299305 A1* | 11/2012 | Brogan | H02J 3/386 290/55 |
| 2013/0176751 A1 | 7/2013 | Olea et al. | |
| 2013/0214536 A1 | 8/2013 | Wakasa et al. | |
| 2014/0361537 A1* | 12/2014 | Andresen | H02J 3/24 290/44 |
| 2015/0188443 A1* | 7/2015 | Takeda | H02M 5/293 416/146 R |
| 2016/0134114 A1* | 5/2016 | Gupta | H02M 7/44 307/82 |

FOREIGN PATENT DOCUMENTS

| | | |
|---|---|---|
| WO | 2012/159989 A2 | 11/2012 |
| WO | 2014/202077 A1 | 12/2014 |

OTHER PUBLICATIONS

P. Huang, M.S. El Moursi, W. Xiao, J.L. Kirtley, "Subsynchronous Resonance Mitigation for Series-Compensated DFIG-Based Wind Farm by Using Two-Degree-of-Freedom Control Strategy", Aug. 28, 2014, IEEE, IEEE Transactions on power systems, vol. 30, Issue 3. (Year: 2014).*

International Search Report of PCT/ES2015/070070, dated Oct. 30, 2015. [PCT/ISA/210].

Written Opinion of PCT/ES2015/070070, dated Oct. 30, 2015. [PCT/ISA/237].

Hari Kishan, "Vector Algebra and Calculus", Department of Mathematics, K.R. College, Mathura, Atlantic Publishers & Distributors (P) Ltd., 2007 (3 pages).

\* cited by examiner

CONTROL METHOD FOR A SYSTEM COMPRISING A FREQUENCY CONVERTER CONNECTED TO A POWER GRID

CROSS REFERENCE TO RELATED APPLICATIONS

This application is a National Stage of International Application No. PCT/ES2015/070070 filed Feb. 2, 2015, the contents of which are incorporated herein by reference in their entirety.

TECHNICAL FIELD

The present invention relates to control methods for frequency converters connected to a power grid, and more specifically to control methods configured to compensate for possible sub-synchronous resonances that may appear in the power grid.

PRIOR ART

Electrical power grids are part of the electrical power supply system consisting of the necessary elements for delivering the electrical power generated by the electrical power generation units to points of consumption, and over long distances. Most of the power grids installed today transport energy in the form of alternating current and voltage. It should be mentioned that the number of grids transporting energy in the form of direct current and voltage has increased in recent years due to the advantages they offer in terms of energy efficiency in long-distance grids. This has been possible as a result of the development experienced by power electronics-based conversion systems which allow interconnecting the two types of grids, AC power grids and DC power grids by means of using the so-called HVDC (High Voltage Direct Current) and HVAC (High Voltage Alternating Current) conversion structures.

Likewise, the development experienced by power electronics is favoring a change towards a distributed generation structure from the basic generation structure used until now and based primarily on large thermal, hydraulic or nuclear power generation plants. One of the main players in the growing distributed generation structure is wind power, which has experienced a significant increase in the last decade in the installation of such generators. Wind power generation is closely related to power electronics because most generators used for converting mechanical wind energy into electrical power injected into the grid are controlled by power electronics-based conversion structures, elements known as frequency converters.

Frequency converters are controlled through control units which, based primarily on detections made through current and voltage transducers, execute control algorithms used for controlling the flow of energy between two electrical systems. The electrical systems can be different kinds of systems, e.g., they could be power grids or electric machines, and the flow of energy can be bidirectional, so that if energy is consumed from the power grid to be transformed into mechanical energy in the shaft of an electric machine, it behaves as a motorization application, such as pumping or ventilation applications, for example. In contrast, energy extracted from an electric machine and injected into the power grid represents a generation application, such as wind generation applications, for example, where the primary source of energy is the wind making the shaft of the electric machine rotate.

Electrical AC power grids usually are primarily made up of cables, physical means through which the energy flows, and voltage transformers which allow adapting voltage levels between different connection points. Both elements, i.e., cables and transformers, are mainly inductive elements and will therefore impose an impedance on the circulation of existing alternating current through the same. Depending on the characteristics of each power grid, the existing inductive impedance will vary, the grid cable length being an important parameter to be taken into account when quantifying the value of inductive impedance. The greater the length, the greater the inductance of the grid will be, and accordingly the greater the inductive impedance will be. The existence of a high inductive impedance in a power grid will entail an increase in the loss of transmission capacity thereof. This phenomenon is due to the voltage drop in the inductive impedance of the cable when current circulates therethrough, and this can be significant in specific cases in which factors such as long cable lengths and high energy consumptions, which cause a high circulation of current through the power grid, are all combined.

Different solutions to the mentioned problem of loss of transmission capacity in power grids having a high inductive impedance are known. One of the most commonly applied solutions has been the compensation for the mentioned highly inductive power grids by means of inserting capacitive elements or capacitors in series. This allows compensating for the inductive impedance characteristic of the power grid by means of inserting capacitive impedance in series, finally resulting in the reduction of the total equivalent impedance. This technique minimizes voltage drop problems in the power grid and accordingly contributes to maintaining the energy transmission capacity thereof. FIG. 1 shows by way of example a one-line circuit diagram of a power grid compensated with series capacitors 15. The different elements making up the power grid are a central energy generation unit 13 depicted in the drawing by means of a wind power generation plant, an equivalent inductance 14 of the power grid transmission lines or cables, capacitors 15 introduced in series in the power grid to compensate for the equivalent inductance of the power grid, and collectors 16 in the power grid joining transmission lines coming from different points.

The insertion of capacitors in series in highly inductive power grids is effective when offering a solution to the problems of loss of transmission capacity of a grid, but in turn it has a very important effect to be taken into account from the point of view of stability of the actual power grid that has been compensated. Specifically, the insertion of a capacitor in series in an inductive grid makes the equivalent circuit of that grid have a natural resonance frequency according to the formula described as follows:

$$f_R = f_0 \sqrt{\frac{X_C}{X_L}}$$

where:
$f_R$: Natural resonance frequency of the compensated grid,
$f_0$: Base frequency of the power grid,
$X_C$: Capacitive impedance of the capacitor inserted in the power grid in series, and
$X_L$: Inductive impedance of the power grid.

Depending on the degree of compensation that has been applied to the power grid, i.e., the percentage of capacitive impedance inserted in the form of capacitors in series with respect to the inductive impedance characteristic of the power grid, the value resulting from the resonance frequency of the power grid will vary. The ratio of capacitive and inductive impedances commonly applied in power grid compensations usually gives resonance frequency values less than the base frequency of the grid. The technical literature uses the term SSI (Sub-Synchronous Interactions) to describe the condition of a power grid having these characteristics.

Grids having sub-synchronous resonances (sub-synchronous resonance currents and voltages) are power grids that are potentially dangerous for integrating generation elements based on generation turbines with rotational shafts that have low-frequency mechanical oscillations. This is the case of synchronous generators with long shafts, which is a typical example of generation stations, in which the mass distribution along the shaft which in turn rotates moved by a primary torque source, i.e., steam, water, etc., commonly have mechanical oscillating frequency modes less than the base frequency of the power grid to which they are connected. In the event that the grid connected to a generator having the mentioned characteristics is compensated with a specific value of series capacitors, which make the resulting natural sub-synchronous resonance frequency coincides with the oscillating frequency of the mechanical shaft, it could have negative effects on the shaft because the amplitude of the mechanical oscillation of the shaft could be amplified with a negative damping. In other words, an increasing amplitude oscillation would occur over time, and may reach an oscillation level that could cause the shaft of the generator to break. This case corresponds to problems characteristic of the natural interaction of two parts of an electrical system, the power grid compensated with capacitors and the generator, where the mechanical mass of a synchronous generator resonates with the sub-synchronous frequency that the grid has. This phenomenon is known in the technical literature as SSR (Sub-Synchronous Resonance).

In addition to the mentioned possibility of the natural resonance frequency of a compensated power grid coinciding with the natural mechanical resonance frequency of generators injecting energy into said grid, the growing presence of frequency converters connected to the grid adds a new aspect to be taken into account from the point of view of grid stability. This aspect is the interaction of the control of frequency converters with compensated grids, a phenomenon that can cause the loss of control of the energy flow through the converter, being able to a make the power grid itself unstable. This phenomenon is known in the literature as SSCI (Sub-Synchronous Control Instability).

The SSCI phenomenon occurs when the control of frequency converters connected to grids compensated with series capacitors makes the converters act like electrical systems, the equivalent resistance of which acquires negative values in the range of frequencies less than the base frequency of the grid. The SSCI phenomenon can even have effects similar to that of the SSR phenomenon, but for that purpose there has to be a large number of frequency converters connected to the compensated grids. The increasingly more widespread use of frequency converters connected to the grid, combined with the existence of power grids compensated with series capacitors, has turned this potentially dangerous scenario into a reality.

The capacity to affect resonance frequency of the system can have negative effects if said interaction amplifies resonance, but it can also be used for damping or compensating for said effects, as described in patent documents EP2317134A2, US20130214536A1 and WO2011112571A2, for example.

Patent document US20130176751A1 belonging to the present applicant discloses a method for a system comprising a frequency converter connected to a power grid, in which the capacity to affect resonance frequency of the system is also used for damping or compensating for the negative effects that the sub-synchronous resonance may cause, acting on the current set points. The system 1000, shown by way of example in FIG. 2, comprises at least one wind turbine 900 and a frequency converter 4 which is controlled by a central control unit 10, said central control unit 10 generating switching commands 11 and 12 for a rectifier 5 and an inverter 6 of the frequency converter 4.

In the method disclosed in said patent document US20130176751A1, the grid voltage is measured to identify resonant frequencies existing in the grid itself and to use it in regulation loops of the frequency converter for the purpose of generating damping current set points 40 and 41 which serve for damping sub-synchronous resonance in the grid. Based on the measurement of the grid voltage 38, the sub-synchronous components $V_{xs}$ and $V_{ys}$ are obtained in a conventional manner as shown in FIG. 3, for example, and which is explained below. Grid voltage 38 is processed mathematically by means of Clarke transformations 42 and the result is processed mathematically by means of Parke transformations 43, vector representation of the grid voltage 38 being generated. Said vector representation is used by a voltage sub-synchronous component identification block 44, using for that purpose filters that allow differentiating the base frequency of the power grid, conventionally 50 or 60 Hz, from the remaining frequencies that may exist. Outputs of the sub-synchronous component identification block 44 are sub-synchronous components $V_{xs}$ and $V_{ys}$ of the grid voltage 38. Adjustments of the filters used for obtaining the sub-synchronous components of the grid voltage 38 are predefined by default to enable obtaining the sub-synchronous components of the voltage of any power grid to which the frequency converter 4 is connected, without needing to know the theoretical sub-synchronous resonance value corresponding to the grid to which the frequency converter 4 is connected, which value could be identified if values of impedances characteristic of the power grid were known and varies from one grid to another. A person skilled in the art knows that the characteristic impedances of a power grid can be identified if the elements making up that power grid are known.

In the method disclosed in said patent document US20130176751A1, the sub-synchronous components are used in a later block, the damping set point regulation block 45, which calculates damping current set points 40 and 41. Said damping current set points 40 and 41 are calculated in active and reactive components (damping current set point 40 and damping current set point 41, respectively).

Damping current set points 40 and 41 are determined in a sub-synchronous resonance damping loop 39 shown in FIG. 4 by way of example, including transformations 42 and 43, loop 44 and block 45, preferably, based on said sub-synchronous components of the grid voltage, because said sub-synchronous components represent the sub-synchronous frequency of the grid. Said damping current set points 40 and 41 are added to the current set points 22 and 32 of the system 1000, as shown by way of example in FIG. 5, such that resonant frequencies are also taken into account when generating switching commands 11 and 12, said frequencies being compensated through the current.

FIG. 6 shows a conventional manner of generating current set points 22 and 32 by way of example, disclosed in said patent document US20130176751A1. Said figure shows block diagram depicting an active power regulation loop 17 and a reactive power regulation loop 27, which are implemented in the central control unit 10 by way of regulation algorithms. Each of said regulation loops 17 and 27 in turn comprises a power regulation loop 17a and 27a known as an external loop, resulting in current set points 22 and 32 (active and reactive current set points, respectively), and a current regulation loop 17b and 27b known as an inner loop, resulting in an active and reactive voltage set point 26 and 36. The structure made up of the two regulation loops 17 and 27 is equivalent for both the active power regulation loop 17 and for the reactive power regulation loop 27.

The active power regulation loop 17 is based on the comparison of an active power set point 18 with the actual value of the active power 19 measured in the system 1000. The error 20 resulting from the comparison is processed by an active power regulator 21 providing the necessary active current output set point 22 to be regulated by the subsequent active current loop 17b. The inner active current regulation loop 17b receives the active current set point 22 imposed at the output of the active power regulator 21 and compares said value with the actual value of the active current 23 measured in the corresponding system. The error 24 resulting from the comparison of both current values 22 and 23 is processed by an active current regulator 25 providing the active voltage output set points 26 to be imposed at the output of the frequency converter 4 by means of static switch switching commands 11 and 12 imposed by a modulation step 100.

Similarly to what has been described for the active power regulation loop 17, the operating principle for the reactive power regulation loop 27 is based on the comparison of a reactive power set point 28 with the actual value of reactive power 29 measured in the system 1000. The error 30 resulting from that comparison is processed by a reactive power regulator 31 providing the necessary reactive current output set point 32 to be regulated by the subsequent reactive current loop 27b. The inner reactive current regulation loop 27b receives the reactive current set point 32 imposed at the output of the reactive power regulator 31 and compares this value to the actual value of reactive current 33 measured in the corresponding system. The error 34 resulting from the comparison of both current values 32 and 33 is processed by the reactive current regulator 35, providing the reactive voltage output set points 36 to be imposed at the output of the frequency converter 4 by means of static switch switching commands 11 and 12 imposed by the modulation step 100.

The active voltage set point 26 and reactive voltage set point 36 are processed by the modulation step 37 which define the switching commands 11 and 12 for the static switches of the frequency converter 4.

In the case of distributed generation systems, such as wind farms, for example, frequency converter compensation capacity largely depends on the current capacity or on the power being delivered by the group of wind turbines connected to the grid.

Therefore, a minimum number of wind turbines connected to the grid at the time of the event will be capable of damping resonance, but if the number of turbines coupled to the grid is not enough to compensate for resonance, said resonance will be maintained regardless of whether the coupled turbines have implemented compensation algorithms (regulation algorithms taking compensation into account).

One of the drawbacks when compensating for resonance through each frequency converter is that each controller is unaware of the total farm capacity to compensate for resonance at a specific time, and each converter will provide predetermined compensation which may not be enough for damping the resonance. If each converter had information about the state of each of the wind turbines on the farm, it could adapt its compensation, but this information is unknown. In addition, making the information reach the controller of each converter by way of communications would not be a solution assuring a fast enough response time.

DISCLOSURE OF THE INVENTION

The object of the invention is to provide a control method for a frequency converter connected to a power grid, as described in the claims.

The control method of the invention is suitable for a system comprising a frequency converter and a generator connected to a power grid. In the method sub-synchronous components of grid voltages are obtained based on detections of said voltages, and damping current set points are determined according to said sub-synchronous components to compensate for sub-synchronous resonances of the grid. Said damping current set points subsequently reach the frequency converter, and the frequency converter regulates them to dampen or compensate for sub-synchronous resonances of the power grid.

Damping current set points are determined by regulation means receiving the sub-synchronous components and returning damping current set points. The regulation means comprise at least one regulator with at least one variable damping gain that is dynamically adjusted according to the sub-synchronous resonance behavior of the power grid, such that the required compensation level can be adapted to the frequency converter for damping sub-synchronous resonance of the grid.

The method thereby uses a compensation algorithm which allows damping resonances of the grid regardless of the number of systems (wind turbines) coupled thereto and the power that each of them is generating, the risk of not being able to duly compensate for said components in some situations, such as for example when there is not a large number of turbines connected to the grid, being eliminated, and the consequences derived therefrom. The compensation algorithm is an auto-adjusting algorithm which adapts control in order to contribute to grid stability according to the total power generated and the capacity of each of the wind turbines coupled to the grid, regardless of the number of turbines connected to the grid at the time of the event.

These and other advantages and features of the invention will become evident in view of the drawings and detailed description of the invention.

DETAILED DISCLOSURE OF THE INVENTION

The description of the invention uses as a reference an energy generation application based on doubly-fed topology. A person skilled in the art will understand that the described invention can be applied to any application which includes at least one frequency converter 4 connected to the grid, even if it is not based on doubly-fed topology. Examples that can be cited would be energy generation or consumption applications in which all the energy flows through the frequency converter 4, i.e., full converter, HVDC applications for electrical power distribution or HVAC applications for electrical power distribution.

Doubly-fed topology is made up of a doubly-fed asynchronous generator in which the terminals of the stator are connected directly to the power grid, and in which the terminals of the rotor are connected to a frequency converter 4 which will in turn be connected to the power grid.

Figure 1:
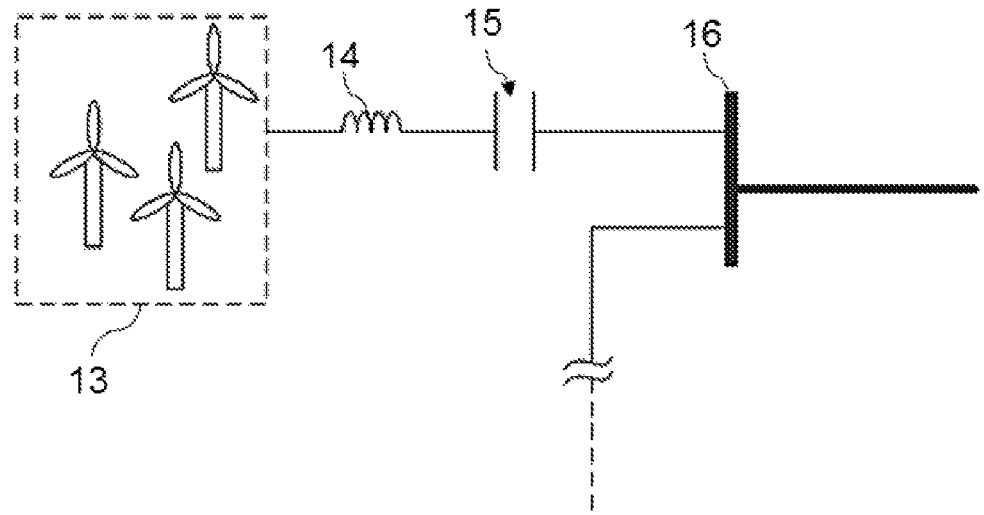
FIG. 1 shows a one-line circuit diagram of a power grid compensated with series capacitors.
Figure 2:
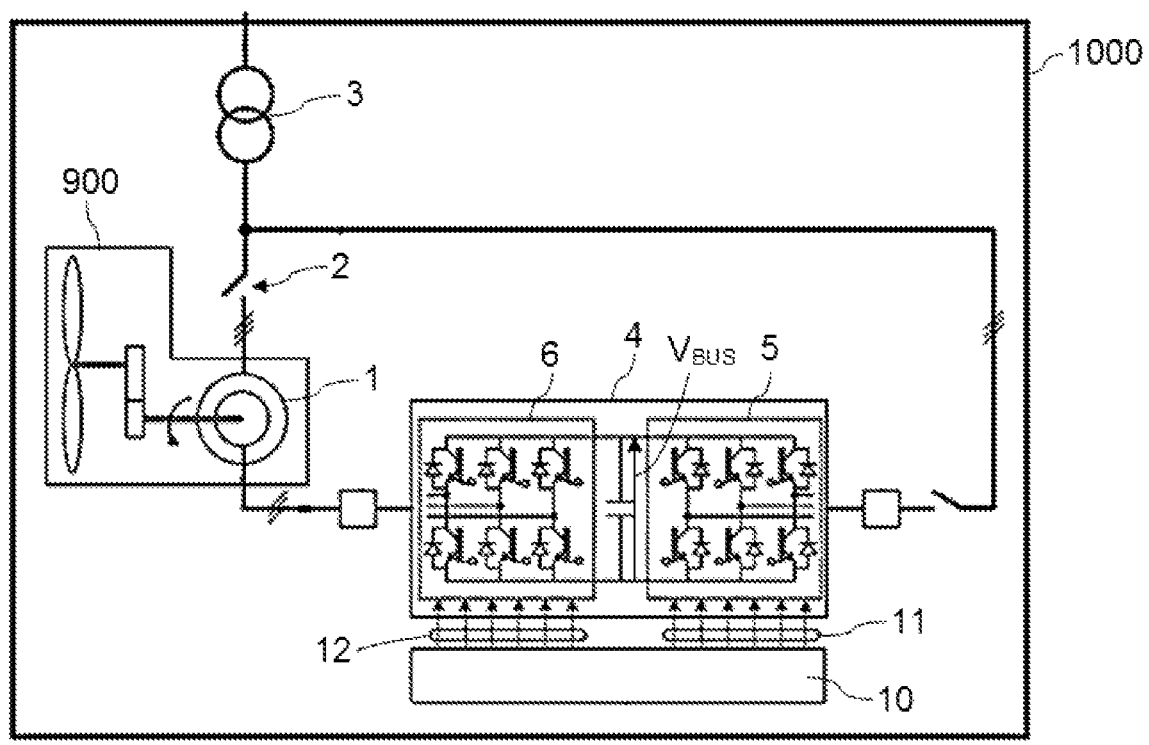
FIG. 2 shows a one-line circuit diagram of a system comprising a frequency converter connected to a power grid, particularly for a wind power generation application based on a doubly-fed topology, where the method of the invention can be implemented.

Patent document US20130176751A1 is incorporated by reference. The method of the invention is suitable for being implemented in electrical power generation systems of different applications as discussed above, such as the one shown in FIG. 2, for example. Said FIG. 2 shows an electrical power generation system 1000 with a turbine 900 including a doubly-fed generator 1, the stator of which is connected to the grid by means of a contactor 2 and a transformer 3. The transformer 3 adapts the output voltage of the stator to the grid voltage value. The rotor of the doubly-fed generator 1 is connected to a frequency converter 4 comprising a grid-side converter or rectifier 5 and a machine-side converter or inverter 6. The system 1000 further comprises a central control unit 10 for generating switching commands 11 for the switches of the rectifier 5 and for generating switching commands 12 for the switches of the inverter 6. In one embodiment, the inverter 6 and the rectifier 5 can include static switches of the IGBT type, with their opening and closing controlled by switching commands 11 and 12 generated by the central control unit 10 (by means of corresponding regulation algorithms).

Operation of the system 1000 is controlled from the central control unit 10, which processes the measurements taken through sensors installed in said system 1000 (of voltage and/or current) and executes programmed control algorithms according to said measurements for controlling the flow of power between the generator 1 and the grid. The final result of executing these algorithms is in the form of switching commands 11 and 12 for the switches comprised both in the rectifier 5 and in the inverter 6. Said switching commands 11 and 12 are calculated by means of modulation steps using pulse width modulation techniques for synthesizing reference voltages that must be applied at the output of the inverter 6 and rectifier 5 for controlling the currents of each based on the voltage of the AC stage. Pulse width modulation techniques are widely used in the art today, being able to choose between scale-based techniques or vector-based techniques. Scale-based modulation techniques are those using the comparison of carrier signals with modulating signals as a basis, for example, PWM (Pulse Width Modulation). Vector-based techniques are those which apply specific switching patterns or vectors during specific previously calculated times in the mentioned modulation steps, for example, SVPWM (Space Vector Pulse Width Modulation).

Figure 3:
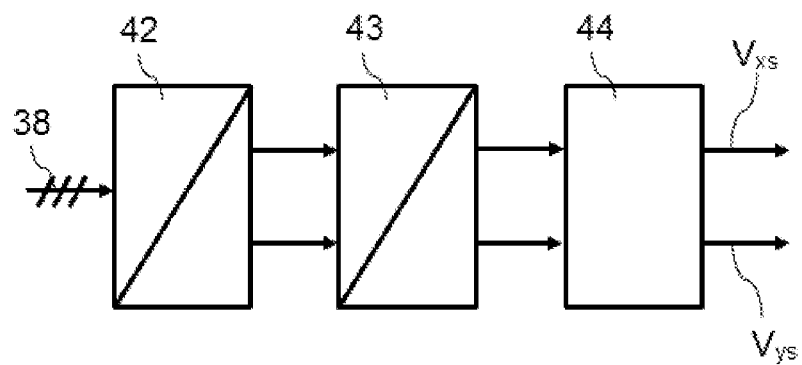
FIG. 3 shows a block diagram depicting a mode of generating the sub-synchronous components of the grid voltage.
Figure 4:
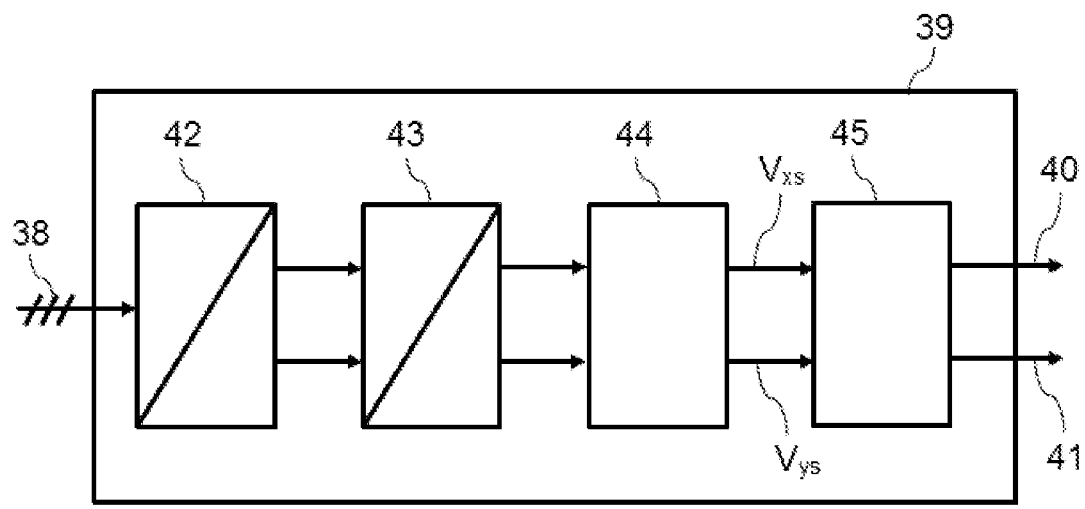
FIG. 4 shows a block diagram describing the sub-synchronous resonance damping loop of a frequency converter of the state of the art.
Figure 5:
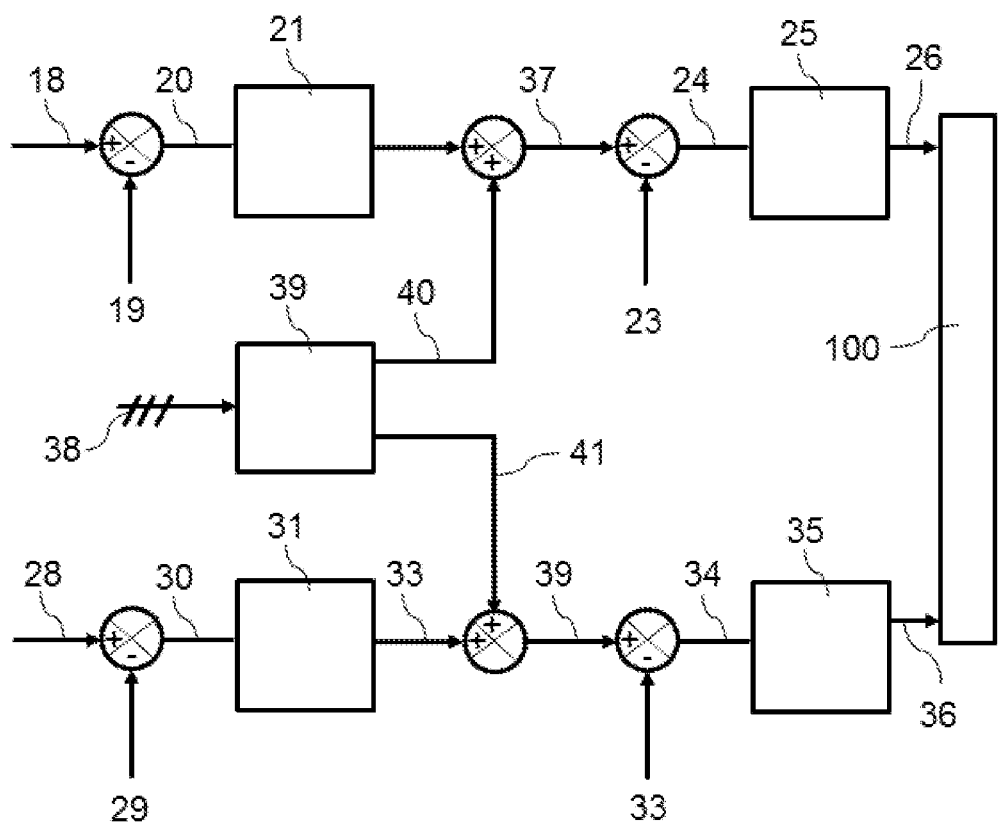
FIG. 5 shows a block diagram where the generation of the total current set points in the state of the art is depicted based on generating active and passive current set points.
Figure 6:
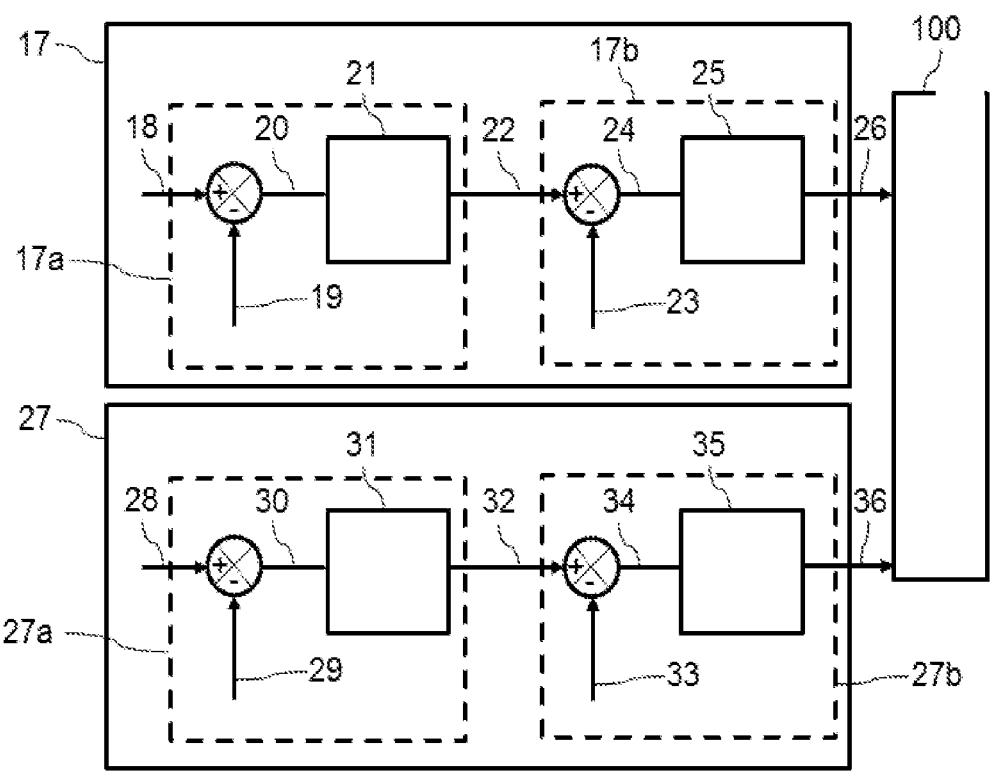
FIG. 6 shows a block diagram where the generation of active and reactive current set points in the state of the art is depicted by means of an active power regulation loop and a reactive power regulation loop.

The method of the invention comprises at least the steps of identifying sub-synchronous components $V_{xs}$ and $V_{ys}$ of the grid voltage 38 based on detections of said grid voltage 38, and of determining damping current set points 40' and 41' according to said sub-synchronous components $V_{xs}$ and $V_{ys}$, to compensate for resonance frequencies of the grid. Said steps are implemented in the central control unit 10. How sub-synchronous components $V_{xs}$ and $V_{ys}$ are obtained is something known in the field, and for that purpose Clarke and Parke transformations can be used, as mentioned in the state of the art, for example, depicted in FIG. 3 and explained in patent document US20130176751A1, or any other known mathematical method can be used.

In the method of the invention, the damping current set points 40' and 41' are determined by regulation means 45' receiving the sub-synchronous components $V_{xs}$ and $V_{ys}$ of the grid voltage 38 and returning the damping current set points 40 and 41. Said regulation means 45' comprise at least one regulator with at least one variable damping gain $46a'$, and said variable damping gain $46a'$ is adjusted dynamically according to the sub-synchronous frequency of the power grid at all times. Therefore, regulation means 45' receive on one hand the sub-synchronous components $V_{xs}$ and $V_{ys}$ of the grid voltage 38 and the adjusted damping gain $46a'$, and return damping current set points 40' and 41' as output. The required compensation level can thereby be adapted to the frequency converter 4 for damping sub-synchronous resonance of the grid, according to actual conditions of the grid to which the system is connected 1000 and of the farm to which the system 1000 belongs. Damping current set points 40' and 41' are generated in a sub-synchronous resonance damping loop 39' such as the one shown by way of example in FIGS. 7 and 9, which replaces the sub-synchronous resonance damping loop 39 of patent document US20130176751A1. The damping set point regulation block 45 of the state of the art is replaced with regulation means 45', which are suitable for receiving the variable adjusted damping gain 46a', and a compensation regulation block 46' is furthermore included for generating the variable damping gain 46a', thereby a modification to the generation of damping current set points 40' and 41' to compensate for sub-synchronous frequencies of the grid being proposed.

The damping gain 46a' is adjusted based on at least one electric variable of the system 1000 reflecting the sub-synchronous frequency of the power grid to which the system 1000 is connected, said electric variable being selected from sub-synchronous components $V_{xs}$ and $V_{ys}$ of the grid voltage 38, the zero-sequence current at a point of the system 1000 where it is possible to determine zero-sequence current (cases of the grid itself, the frequency converter 4 or the stator of the generator 1, if any), and the bus voltage $V_{BUS}$ of the frequency converter 4. Determination of the zero-sequence current depends on detections of current available in the system 1000, and also on the neutral operation of the system 1000 itself (of both the turbine 900 and frequency converter 4) because a neutral point connection is necessary for there to be a zero-sequence current. The requirements for there to be a zero-sequence current and the determination thereof is something that is already known in the state of the art, therefore it will not be explained in further detail.

To adjust a damping gain 46a' based on one of said electric variables, the module of said electric variable is determined, the damping gain 46a' being calculated based on said module preferably by means of a regulator which receives said module as input and returns the damping gain 46a' and which is comprised in the compensation regulation block 46'. Said regulator can be a proportional regulator, a PI regulator or a PID regulator, the gain (or gains) of which is determined previously according to the grid to which the system 1000 is connected and to the farm it belongs (to the number of systems 1000 forming said farm). Instead of a regulator, the compensation regulation block 46 can comprise a look-up table, for example, or another known alternative, for establishing an output value (damping gain 46a') according to the inputs.

Figure 7:
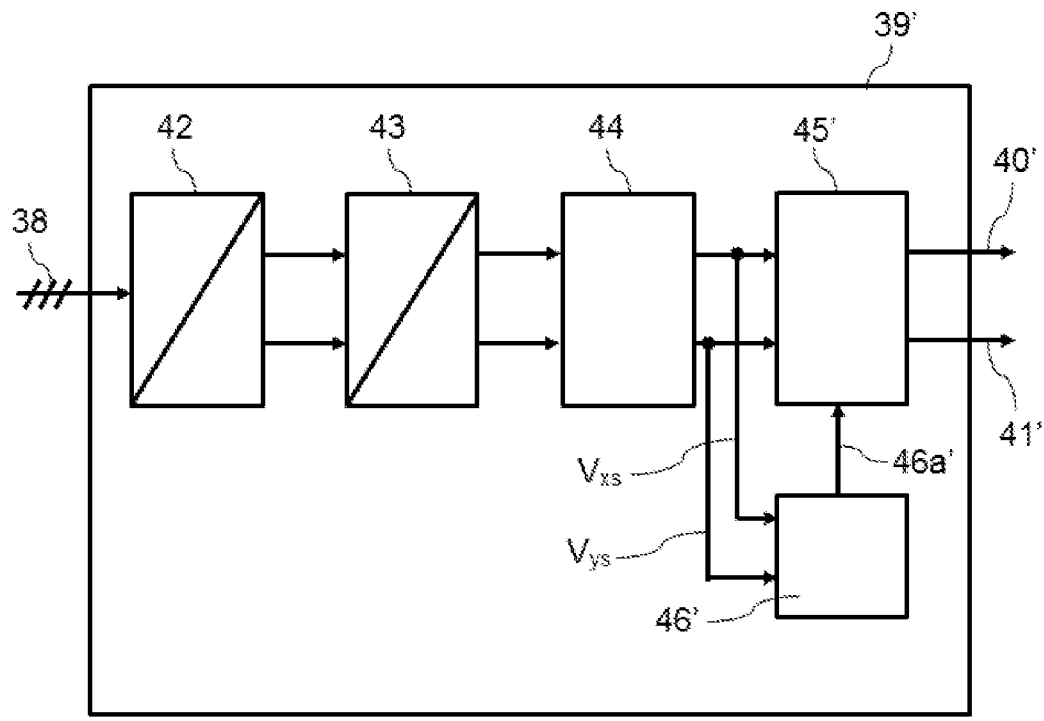
FIG. 7 shows an embodiment of the method of the invention based on a block diagram representation, in which the damping current set points are generated based on a damping gain from sub-synchronous components of the grid voltage.
Figure 8:
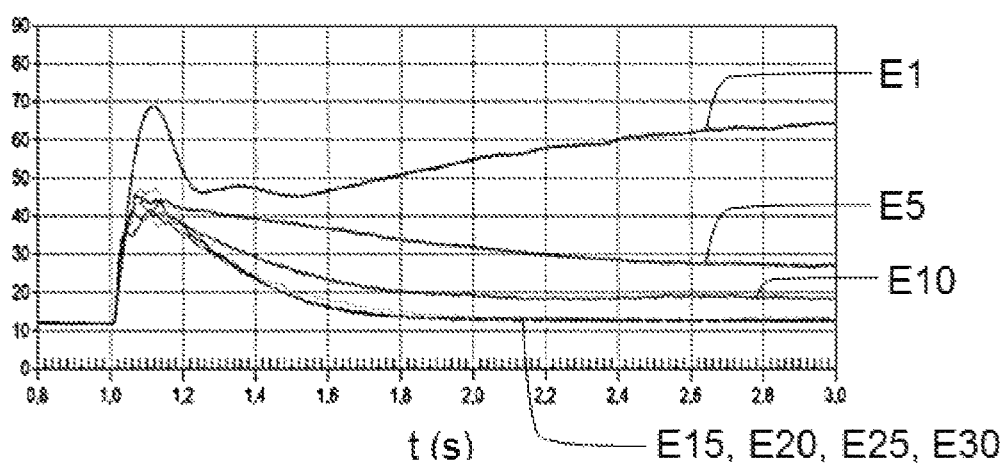
FIG. 8 shows variation in damping gain by applying the method depicted in FIG. 7, depending on the number of wind turbines connected to the grid.

In one embodiment shown by way of example in FIG. 7, the compensation regulation block 46' receives sub-synchronous components $V_{xs}$ and $V_{ys}$ of the grid voltage 38 coming from the sub-synchronous resonance identification block 44 as input for calculating the variable parameter 46a', and determines the module of said sub-synchronous components $V_{xs}$ and $V_{ys}$, said module reaching the regulator of the compensation regulation block 46'. Regulator output is the damping gain 46a'. FIG. 8 shows the results of a simulation of a variation in damping gain 46a' in a system 1000 during a time interval t by applying the regulation algorithm defined in FIG. 7 for one and the same value of the module of the sub-synchronous components $V_{xs}$ and $V_{ys}$ and for different numbers of turbines 900 connected to the grid at the time of the event (one turbine, evolution E1; five turbines, evolution E5; ten turbines, evolution E10; fifteen turbines, evolution E15; twenty turbines, evolution E20; twenty-five turbines, evolution E25; and thirty turbines, evolution E30). The number of systems 1000 connected to the grid is not known, and said FIG. 8 shows evolution of variation in damping gain 46a' for different cases, demonstrating that the compensation regulation block 46' provides a different damping gain 46a' according to the systems 1000 connected to the grid, it being automatically adjusted to the actual need without having to know the total capacity of the farm to which the system 1000 belongs, to compensate for resonance at a specific time.

Figure 9:
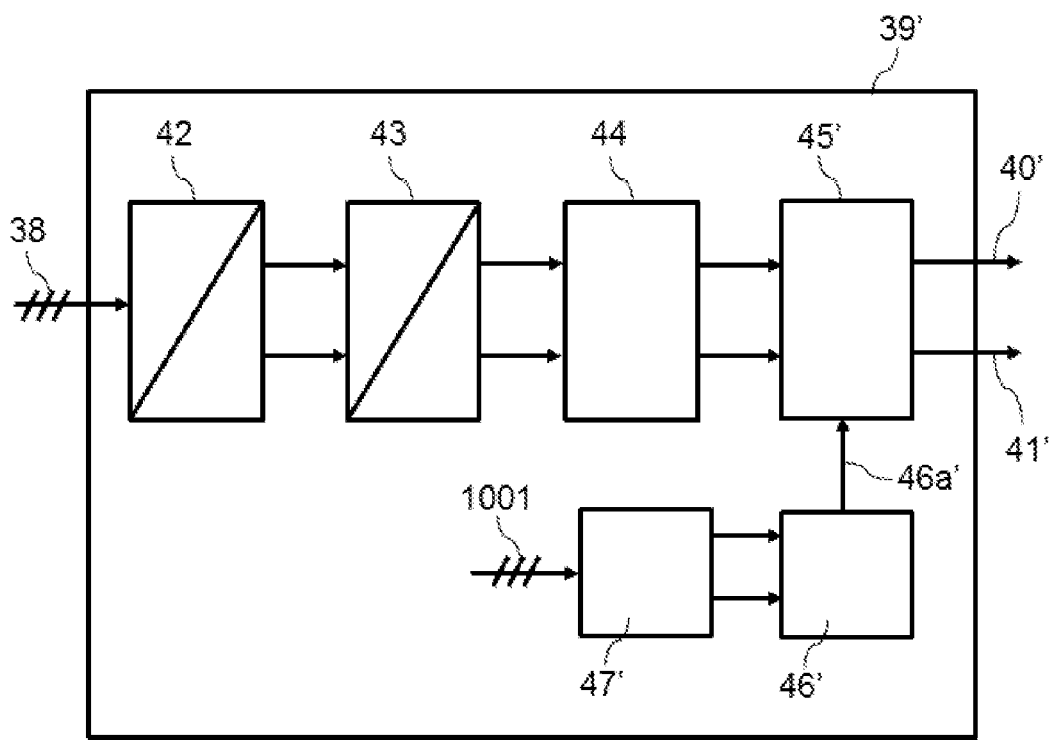
FIG. 9 shows an embodiment of the method of the invention based on a block diagram representation, in which the damping current set points are generated based on a damping gain from the zero-sequence current of the grid, the frequency converter or the stator of the turbine generator.

In another embodiment shown by way of example in FIG. 9, the compensation regulation block 46' receives the zero-sequence current as input for calculating the damping gain 46a'. A zero-sequence component identification block 47' receives the current measurements of a point of the system 1000 (of the grid current, stator or converter, for example), and calculates the corresponding zero-sequence current based on said measurements. Various techniques for calculating zero-sequence current are known in the art, and any of them can be used in this case. The zero-sequence current enters the compensation regulation block 46', and said compensation regulation block 46' calculates the value of the damping gain 46a' for the damping set point regulation block 45' according to said zero-sequence current. The compensation regulation block 46' determines the module of said zero-sequence current, and said module reaches the regulator comprised in the compensation regulation block 46' itself.

In another embodiment not shown in the drawings, the compensation regulation block 46 can calculate the damping gain 46a' based on the bus voltage $V_{BUS}$ of the frequency converter, because, in the event of resonance, the bus voltage $V_{BUS}$ comprises oscillations. Said compensation regulation block 46' determines the module of the bus voltage $V_{BUS}$, and said module reaches the regulator comprised in the compensation regulation block 46'.

In other embodiments not shown in the drawings, the compensation regulation block 46' calculates at least two compensation gains 46a', based on one of the electric variables selected from the sub-synchronous components of the grid voltage, the zero-sequence current or bus voltage $V_{BUS}$. The compensation regulation block 46' determines the module of the corresponding electric variable and the derivative thereof, and said module and said derivative reach their respective regulator comprised in the compensation regulation block 46' itself. Each regulator calculates a respective damping gain, and the highest of them is received by the damping set point regulation block 45' for generating damping current set points 40' and 41'. Evolution of sub-synchronous frequency can be estimated when considering the derivative, and a faster response can be provided (damping current set points 40' and 41' are anticipated).

In other embodiments not shown in the drawings, a plurality of damping gains 46a' is calculated based on the sub-synchronous components $V_{xs}$ and $V_{ys}$, zero-sequence components and/or bus voltage, each of them by means of the compensation regulation block 46' thereof. The highest damping gain 46a' calculated for generating damping current set points 40' and 41' is preferably applied in the damping set point regulation block 45'. Each compensation regulation block 46' can be implemented with only the module of the corresponding electric variable, or with the module and derivative of said electric variable.

In other embodiments not shown in the drawings, the damping set point regulation block 45' receives at least two damping gains 46a': one for the sub-synchronous component $V_{xs}$ and the other one for the sub-synchronous component $V_{ys}$. Therefore, one of the damping current set points 40' and 41' is determined by means of a first regulator of the regulation means 45' based on one of the sub-synchronous components $V_{xs}$ and $V_{ys}$ with the corresponding damping gain 46a', and the other damping current set point 40' and 41' is determined by means of a second regulator of the regulation means 45' based on the other sub-synchronous component $V_{xs}$ and $V_{ys}$ with the other corresponding damping gain 46a'. One of the damping gains 46a' is calculated based on the sub-synchronous components $V_{xs}$ and $V_{ys}$, (preferably the one that is later associated with the sub-synchronous component $V_{xs}$), and the other damping gain 46a' is calculated based on the zero-sequence current (preferably the one that is later associated with the sub-synchronous component $V_{xy}$). How to calculate a damping gain 46a' based on sub-synchronous components $V_{xs}$ and $V_{ys}$ and zero-sequence current has previously been discussed.

For the method, in any of its embodiments, a maximum limit and minimum limit are preferably pre-established for each one of the variable parameters 46a' has a maximum limit and a minimum limit. The limits are established according to the characteristics of the grid and the farm where the corresponding turbine 900 is installed. The maximum limit, for example, is established according to the gain required in the event that compensation must be done by means of a single wind turbine 900. The minimum limit, for example, is established according to the gain required in the event that compensation is done by means of all the wind turbines 900 on the farm.

The current capacity of the frequency converter 4 must also be considered to establish the limits because the frequency converter 4 must work in conditions in which a sub-synchronous compensation component must be added to the current set point of the regulation loops. This current affects the losses of the frequency converter 4, and therefore thermal performance, and it must be assured that safe working conditions are applied at all times.

In some embodiments, the method is furthermore suitable for stopping the determination of damping current set points 40' and 41' and for generating an alarm whereby disconnection of the corresponding turbine 900 from the grid is preferably caused, if it is determined that resonance cannot be compensated. Different techniques can be used to determine whether or not resonance can be compensated, such as:

If it is determined that the module of the sub-synchronous components $V_{xs}$ and $V_{ys}$, or the derivative of said module, exceeds a predetermined safety threshold, it is determined that resonance cannot be compensated. System shut-down would be instantaneous under these conditions.

If it is determined that the module of the sub-synchronous components $V_{xs}$ and $V_{ys}$, or the derivative of said module, exceeds a predetermined safety threshold throughout a predetermined safety time, it is determined that resonance cannot be compensated. Predetermined thresholds and safety time are set at a value which assures operation of both the mechanical and electrical components of the turbine 900 in safe conditions, and they also depend on the existence and adjustment of additional protections of the wind farm. For example, it could be adjusted for a case in which the sub-synchronous component $V_{xs}$, $V_{ys}$ of the grid voltage 38 exceeds 8% of the rated voltage value for 10 seconds or the derivative is positive for 250 ms.

If it is determined that the value of the damping gain 46a' reaches its maximum limit and maintains said maximum limit throughout a predetermined safety time, it is determined that resonance cannot be compensated. The maximum limit could be set, for example, at 50, which allows compensating for resonance with 10% of the turbines 900 on the farm coupled to the grid.

In summary, any of the embodiments of the proposed method allows changing compensation of sub-synchronous components $V_{xs}$ and $V_{ys}$ through the compensation regulation block 46', such that the greater the module (and/or derivative) of the sub-synchronous components $V_{xs}$ and $V_{ys}$ of the grid voltages 38, the greater the compensation. In the event that all the wind turbines 900 on a farm are coupled, small compensation of each of them will be enough to compensate for resonance. In the opposite case in which few turbines 900 are coupled, a greater compensation component will be required of them. The regulation system reaches a balance in which compensation is distributed among the available wind turbines 900 without having to know the power generated by each of them and the total wind farm power.

Figure 10:
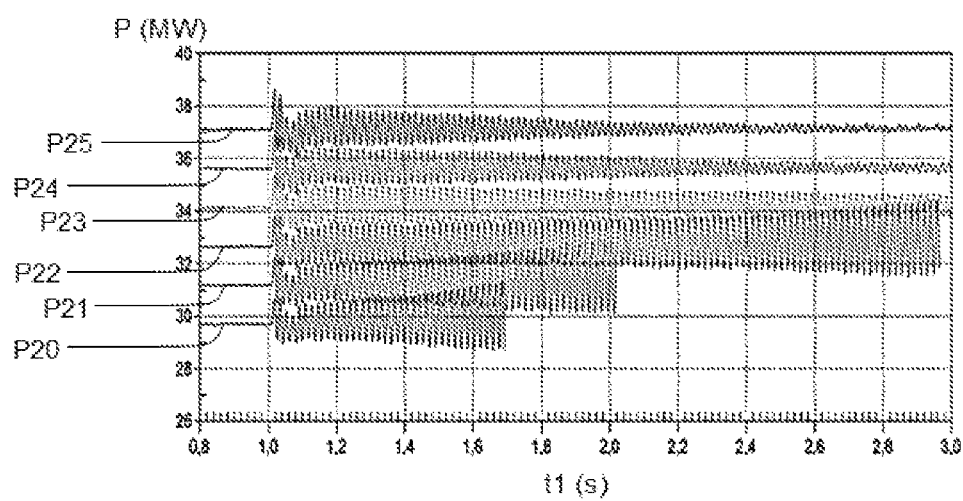
FIG. 10 shows the total active power generated by a wind farm in a sub-synchronous resonance event for different numbers of turbines on the farm coupled to the grid, seen from a system in which the method of the state of the art is applied to compensate for said sub-synchronous resonance.

FIG. 10 shows the performance of a wind generation application based on doubly-fed topology controlled by a frequency converter 4, the operation of which is controlled by the regulation algorithm with resonance compensation considering the total available farm capacity (without implementing the invention). FIG. 10 shows the total power P generated by a wind farm in a sub-synchronous resonance event during a specific time interval t1 and for a specific number of turbines 900 coupled to the grid in each case, in which resonance is only compensated and stabilized for a minimum number of turbines 900 coupled to the grid. Specifically, the results are shown for the following numbers of turbines 900 coupled to the grid: 20 (total power P20), 21 (total power P21), 22 (total power P22), 23 (total power P23), 24 (total power P24) and 25 (total power P25).

Figure 11:
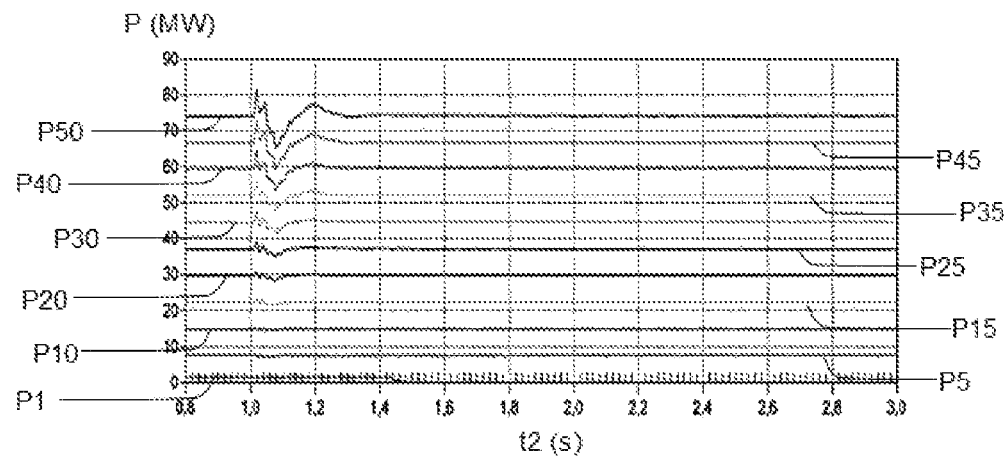
FIG. 11 shows the total active power generated by a wind farm in a sub-synchronous resonance event for different numbers of turbines on the farm coupled to the grid, seen from a system in which an embodiment of the method of the invention is applied, in which the damping gain for determining damping current set points is calculated based on the sub-synchronous components of the grid voltage.

FIG. 11 shows the performance of the wind farm with compensation with variable parameters 46a' according to the sub-synchronous components $V_{xs}$ and $V_{ys}$ of the voltage of the power grid during a specific time interval t2 and for a specific number of turbines 900 coupled to the grid in each case. It is found that performance improves with respect to the previous case of the state of the art (FIG. 10), stability of the system 1000 improving regardless of the power being generated and the number of wind turbines 900 connected to the grid. Specifically, the results are shown for the following numbers of turbines 900 coupled to the grid: 1 (total power P1), 5 (total power P5), 10 (total power P10), 15 (total power P15), 20 (total power P20), 25 (total power P25), 30 (total power P30), 35 (total power P35), 40 (total power P40), 45 (total power P45) and 50 (total power P50).

Figure 12:
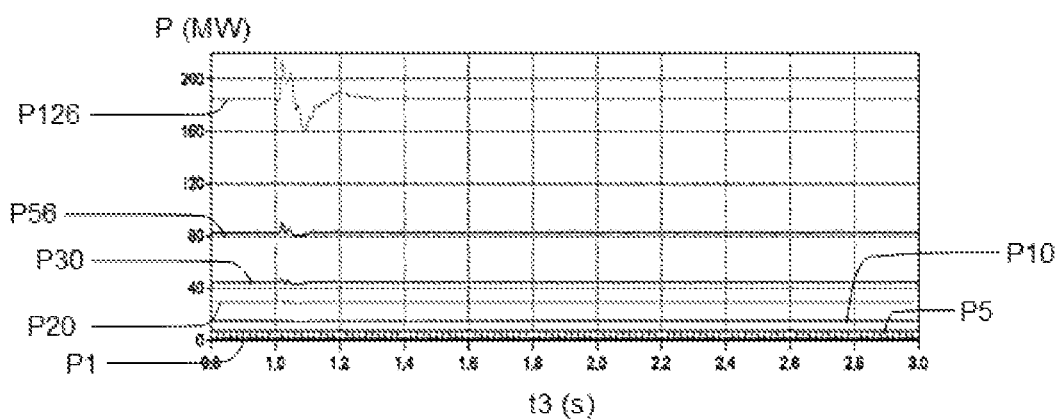
FIG. 12 shows the total active power generated by a wind farm in a sub-synchronous resonance event for different numbers of turbines on the farm coupled to the grid, seen from a system in which an embodiment of the method of the invention is applied, in which the damping gain for determining damping current set points is calculated based on the zero-sequence current of the grid, the frequency converter or the stator of the turbine generator.

FIG. 12 likewise shows performance of the wind farm with compensation with variable parameters 46a' according to the zero-sequence component of the current during a specific time interval t3 and for a specific number of turbines 900 coupled to the grid in each case. It is also found that performance improves with respect to the previous case of the state of the art (FIG. 10), stability of the system 1000 improving regardless of the power being generated and the number of wind turbines 900 connected to the grid. Specifically, the results are shown for the following numbers of turbines 900 coupled to the grid: 1 (total power P1), 5 (total power P5), 10 (total power P10), 20 (total power P20), 30 (total power P30), 56 (total power P56) and 126 (total power P126).

The invention claimed is:

1. A control method for controlling a system having a frequency converter connected to a power grid, the method comprising,
obtaining sub-synchronous components of a grid voltage of the power grid;
determining damping current set points from the sub-synchronous components of the grid voltage and based on a variable damping gain generated from the sub-synchronous components of the grid voltage; and
outputting the damping current set points to control circuitry to compensate for sub-synchronous resonances of the power grid in current regulators controlling operation of the frequency converter,
wherein the variable damping gain is dynamically adjusted according to a sub-synchronous component of the power grid such that a required compensation level of the frequency converter is adapted for damping sub-synchronous resonance of the power grid,
wherein the variable damping gain is adjusted based on at least one electric variable of the system reflecting a sub-synchronous resonance behaviour of the power grid, said electric variable being selected from the sub-synchronous components of the grid voltage, a zero-sequence current at a point in the system where it is possible to determine the zero-sequence current, and a bus voltage of the frequency converter,
the method further comprising determining at least a module of said electric variable to adjust the variable damping gain based on the electric variable, the variable damping gain being calculated based on said module by a regulator receiving said module as input and returning the damping gain.

2. The method according to claim 1, wherein the variable damping gain used for obtaining the damping current set points is limited by a maximum limit and a minimum limit, both of which are pre-established according to characteristics of the power grid and of a power generation farm where the frequency converter is located.

3. The method according to claim 1, wherein if it is determined that the module of an electric variable based on which the variable damping gain is calculated, or the derivative of said module, exceeds a predetermined safety threshold, determination of the damping current set points is stopped and the system is decoupled from the power grid.

4. The method according to claim 1, wherein if it is determined that the module of an electric variable based on which the variable damping gain is calculated, or the derivative of said module, exceeds a predetermined safety threshold for a predetermined safety time, determination of the damping current set points is stopped and the system is decoupled from the power grid.

5. The method according to claim 4, wherein the variable damping gain used for obtaining the damping current set points is limited by a maximum limit and a minimum limit, both of which are pre-established according to characteristics of the power grid and of a power generation farm where the frequency converter is located.

6. An electrical power generation system comprising,
a frequency converter connected to a power grid,
a voltage detector for detecting a grid voltage of the power grid,
a current detector for detecting a grid current of the power grid, and
a central control unit for controlling the frequency converter, configured for implementing a method according to claim 1.

7. The method according to claim 1, wherein the variable damping gain comprises a first damping gain and a second damping gain, the method further comprising calculating the first damping gain based on a first electric variable reflecting the sub-synchronous component of the power grid and the second damping gain based on a second electric variable also reflecting the sub-synchronous frequency of the power grid, said first and second electric variables being selected from the sub-synchronous components of the grid voltage, the zero-sequence current, and a bus voltage of the frequency converter, and selecting a higher of the first damping gain and the second damping gain as the variable damping gain.

8. A method according to claim 7 wherein a first of the damping current set points is determined based on one of the sub-synchronous components, and a second damping current set point is determined based on another of the sub-synchronous components, the first damping gain being determined based on the sub-synchronous components of grid voltages, and the second damping gain being determined based on the zero-sequence current, the damping current set points being determined based on both the first damping gain and the second damping gain.

9. The method according to claim 1, wherein the variable damping gain used for obtaining the damping current set points is limited by a maximum limit and a minimum limit, both of which are pre-established according to characteristics of the power grid and of a power generation farm where the frequency converter is located.

10. The method according to claim 9, wherein if it is determined that the value of the variable damping gain reaches the maximum limit and maintains said maximum limit throughout a predetermined safety time, determination of the damping current set points is stopped and the system is decoupled from the power grid.

11. The method according to claim 1, wherein the variable damping gain used for obtaining the damping current set points is limited by a maximum limit and a minimum limit, both of which are pre-established according to a current capacity of the frequency converter.

12. The method according to claim 11, wherein if it is determined that the value of the variable damping gain reaches the maximum limit and maintains said maximum limit throughout a predetermined safety time, determination of the damping current set points is stopped and the system is decoupled from the power grid.

13. An electrical power generation system comprising,
a frequency converter connected to a power grid,
a voltage detector for detecting a grid voltage of the power grid,
a current detector for detecting a grid current of the power grid, and
a central control unit for controlling the frequency converter, configured for implementing a method according to claim 11.

14. The method according to claim 1, wherein the variable damping gain used for obtaining the damping current set points is limited by a maximum limit and a minimum limit, both of which are pre-established according to characteristics of the power grid and of a power generation farm where the frequency converter is located and according to a current capacity of the frequency converter.

15. The method according to claim 14, wherein if it is determined that the value of the variable damping gain reaches the maximum limit and maintains said maximum limit throughout a predetermined safety time, determination of the damping current set points is stopped and the system is decoupled from the power grid.

16. An electrical power generation system comprising,
a frequency converter connected to a power grid,
a voltage detector for detecting a grid voltage of the power grid,
a current detector for detecting a grid current of the power grid, and
a central control unit for controlling the frequency converter, configured for implementing a method according to claim 14.

* * * * *